US012218398B2

(12) United States Patent
Xiong et al.

(10) Patent No.: US 12,218,398 B2
(45) Date of Patent: Feb. 4, 2025

(54) MICRO-SUBMINIATURE MICROWAVE GYROMAGNETIC CIRCULATOR

(71) Applicant: Shenzhen Huayang Technology Development Co., Ltd., Guangdong (CN)

(72) Inventors: Fei Xiong, Guangdong (CN); Wei Zhang, Guangdong (CN)

(73) Assignee: Shenzhen Huayang Technology Development Co., Ltd., Shenzhen (CN)

( * ) Notice: Subject to any disclaimer, the term of this patent is extended or adjusted under 35 U.S.C. 154(b) by 148 days.

(21) Appl. No.: 18/136,337

(22) Filed: Apr. 19, 2023

(65) Prior Publication Data

US 2023/0261355 A1 Aug. 17, 2023

Related U.S. Application Data

(63) Continuation of application No. PCT/CN2020/140714, filed on Dec. 29, 2020.

(51) Int. Cl.
*H01P 1/387* (2006.01)

(52) U.S. Cl.
CPC .................................... *H01P 1/387* (2013.01)

(58) Field of Classification Search
CPC .... H01P 1/387; H01P 1/38; H01P 1/36; H01P 1/383; H01P 1/32
See application file for complete search history.

(56) References Cited

U.S. PATENT DOCUMENTS

| | | | | |
|---|---|---|---|---|
| 11,116,092 | B1 * | 9/2021 | Zhu | H05K 5/04 |
| 2016/0254580 | A1 * | 9/2016 | Sasaki | H01P 1/387 333/1.1 |
| 2021/0218119 | A1 * | 7/2021 | Xiong | H01P 1/383 |

* cited by examiner

*Primary Examiner* — Stephen E. Jones

(57) ABSTRACT

The present invention relates to a micro-subminiature microwave gyromagnetic circulator comprising a housing and a first ceramic ring ferrite, a central conductor, a second ceramic ring ferrite and a medium ferrule mounted inside the housing; the medium ferrule comprises a pin, and a foot of the central conductor is provided with a through-hole matching the pin; the pin comprises an extension and a fixed portion which are connected, wherein the diameter of the extension is smaller than the diameter of the fixed portion, the pins and the feet are welded at the through-holes via solder paste, and a tin-containing tank is provided at the connection between the extension and the fixed portion. The microwave gyromagnetic circulator can be micro-subminiature without decreasing bandwidth. The structure stability and conduction stability of the microwave gyromagnetic circulator are improved by welding the central conductor to the pin and providing a tin-containing tank on pin.

10 Claims, 6 Drawing Sheets

MICRO-SUBMINIATURE MICROWAVE GYROMAGNETIC CIRCULATOR

CROSS REFERENCE TO RELATED APPLICATIONS

The present application is a Continuation Application of PCT Application No. PCT/CN2020/140714 filed on Dec. 29, 2020, the contents of which are incorporated herein by reference in their entirety.

TECHNICAL FIELD

The present invention relates to the field of microwave ferrite devices, in particular to a micro-subminiature microwave gyromagnetic circulator.

BACKGROUND ART

Embedded isolators are widely used in 2G/3G/4G, Internet of Things era, including 5G has become closer and closer to us in the future. According to relevant reports, 5G in China is expected to achieve commercial, Internet of Things, intelligent household appliances, unmanned technology in 2020, mobile data traffic will increase 8 times, and 5G users are expected to break through 1 billion because of the rapid increase in the number, upstream customers put forward very strict requirements for cost control, miniaturization and mass production of isolators manufacturers.

The difficulty in miniaturization of microwave gyromagnetic circulators is that miniaturization can affect the bandwidth of the device. The size of the existing circulators for base stations is concentrated in 10 mm and 7 mm, which is bulky and costly. In addition, in miniature microwave gyromagnetic circulators, the central conductor and the medium ferrule are often in direct contact to achieve conduction, the structural stability is difficult to be guaranteed, and the phenomenon that the central conductor and the medium ferrule are disconnected easily occurs.

SUMMARY OF THE INVENTION

The technical problem to be solved by the present invention is to provide a micro-subminiature microwave gyromagnetic circulator with stable structure to ensure that the bandwidth of the circulator does not decrease as the conductor size decreases.

In order to solve the above technical problem, the technical solution adopted by the present invention is: a micro-subminiature microwave gyromagnetic circulator comprising a housing and a compensation sheet, a first magnet, a first iron sheet, a first ceramic ring ferrite, a central conductor, a second ceramic ring ferrite, a second iron sheet, a second magnet and a medium ferrule provided successively from top to bottom and mounted inside the housing; the medium ferrule comprises a connection seat and three pins provided on the connection seat, the central conductor is Y-shaped, and three feet of the central conductor are respectively provided with through-holes matching the pins; the first ceramic ring ferrite comprises a first ceramic ring and a first ferrite sleeved in the first ceramic ring, the second ceramic ring ferrite comprises a second ceramic ring and a second ferrite sleeved in the second ceramic ring, and the dielectric constant of the first ceramic ring ferrite and the dielectric constant of the second ceramic ring ferrite are respectively greater than or equal to 30; the first ferrite and the second ferrite are respectively BiCaVIG ferrites; the pin comprises an extension and a fixed portion which are connected, the diameter of the extension is smaller than the diameter of the fixed portion fixed on the connection seat, the pins and the feet are welded at the through-holes via solder paste, the connection of the extension and the fixed portion is provided with a tin-containing tank for receiving part of the solder paste, and a bottom surface of the foot abuts against an end surface of the fixed portion near one end of the extension.

The advantageous effect of the present invention is that according to the structure of the micro-subminiature microwave gyromagnetic circulator according to the present invention, by introducing a ferrite with a high dielectric constant, since the size of the conductor is inversely proportional to the open root of the dielectric constant of the ferrite, it is still possible to ensure that the bandwidth of the circulator does not decrease when the size of the microwave gyromagnetic circulator is reduced; further, the existence of the tin-containing tank on the pin not only increases the contact area between the solder paste and the pin, but also forms a clamping structure, which greatly reduces the risk of the solder paste backing out along the axial direction of the pin, and is beneficial to ensure that the foot region around the through-hole is close to the fixed portion, thereby improving the structural stability of the micro-subminiature microwave gyromagnetic circulator, and the conduction between the central conductor and the pin solder can also ensure the working stability of the micro-subminiature microwave gyromagnetic circulator.

Figure 1:
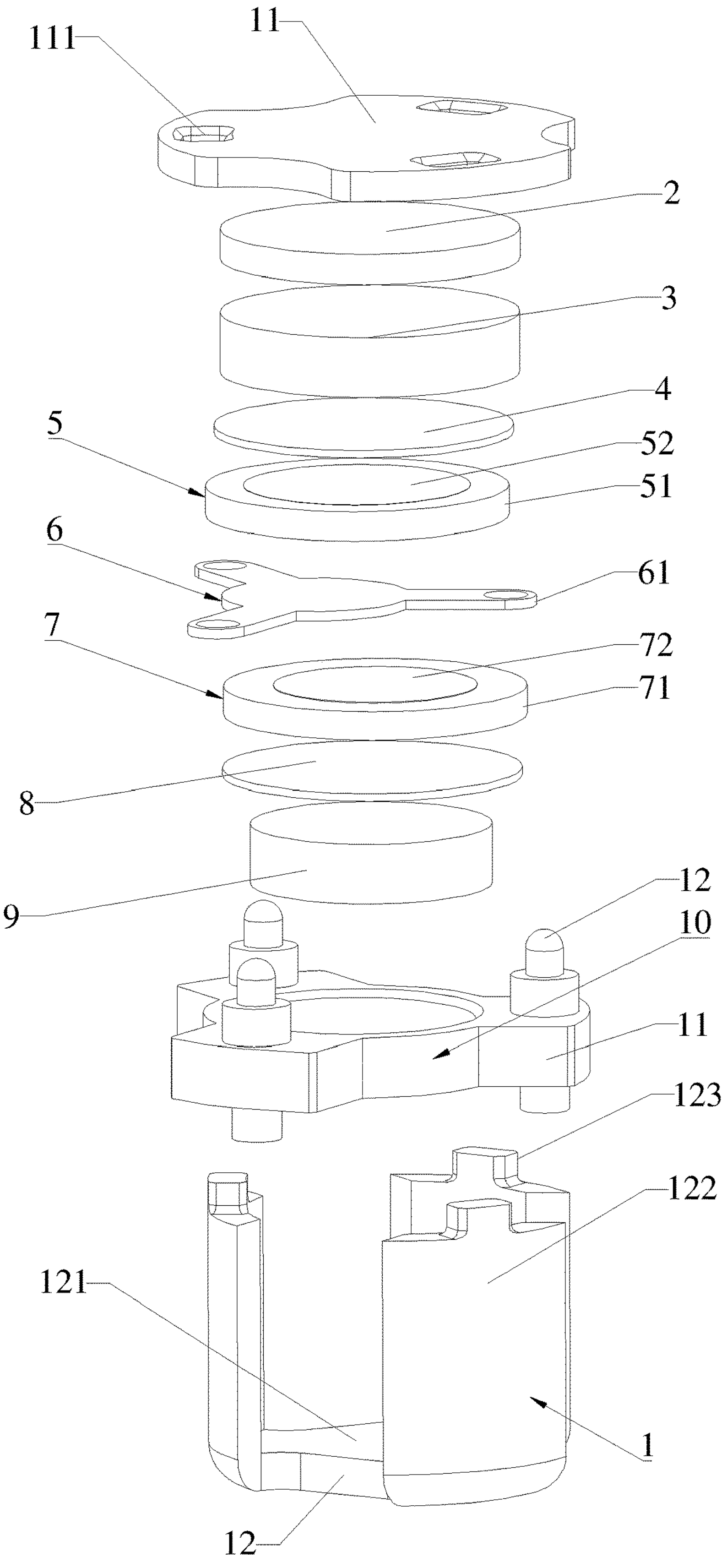
FIG. 1 is an exploded view showing the structure of a micro-subminiature microwave gyromagnetic circulator according to an embodiment of the present invention.

1. housing; 11. upper cover; 111. groove; 12. base; 121. base plate; 122. side plate; 123. protrusion;

2. compensation sheet;
3. first magnet;
4. first iron sheet;
5. first ceramic ring ferrite; 51. first ceramic ring; 52. first ferrite;
6. central conductor; 61, feet; 611, perforation;
7. second ceramic ring ferrite; 71. second ceramic ring; 72. second ferrite;
8. second iron sheet;
9. second magnet;
10. medium ferrule;
11. connection seat;
12. pin; 121. extension; 122. fixed portion; 123. tin-containing tank; 124. vent slot; 125. step; 126. receiving groove.

DETAILED DESCRIPTION OF THE INVENTION

In order to explain the technical contents, the objects, and the effects of the present invention in detail, the embodiments will be described below with reference to the accompanying drawings.

With reference to FIGS. 1 to 10, the present invention relates to a micro-subminiature microwave gyromagnetic circulator, comprising a housing 1 and a compensation sheet 2, a first magnet 3, a first iron sheet 4, a first ceramic ring ferrite 5, a central conductor 6, a second ceramic ring ferrite 7, a second iron sheet 8, a second magnet 9 and a medium ferrule 10 provided successively from top to bottom and mounted inside the housing 1; the medium ferrule 10 comprises a connection seat 11 and three pins 12 provided on the connection seat 11, the central conductor 6 is Y-shaped, and three feet 61 of the central conductor 6 are respectively provided with through-holes cooperating with the pins 12; the first ceramic ring ferrite 5 comprises a first ceramic ring 51 and a first ferrite 52 sleeved in the first ceramic ring 51, the second ceramic ring ferrite 7 comprises a second ceramic ring 71 and a second ferrite 72 sleeved in the second ceramic ring 71, and the dielectric constant of the first ceramic ring ferrite 5 and the dielectric constant of the second ceramic ring ferrite 7 are respectively greater than or equal to 30; the first ferrite 52 and the second ferrite 72 are respectively BiCaVIG ferrites; the pin 12 comprises an extension 121 and a fixed portion 122 connected, wherein the diameter of the extension 121 is smaller than the diameter of the fixed portion 122, the fixed portion 122 is fixed on the connection seat 11, the pin 12 and the feet 61 are welded at the through-holes via solder paste, the connection of the extension 121 and the fixed portion 122 is provided with a tin-containing tank 123 for containing part of the solder paste, and the bottom surface of the feet 61 abuts against the end surface of the fixed portion 122 near one end of the extension 121.

In the micro-subminiature microwave gyromagnetic circulator, ferrite having a high dielectric constant is introduced, since the size of the conductor is inversely proportional to the dielectric constant of the ferrite, it is still possible to ensure that the bandwidth of the microwave gyromagnetic circulator does not decrease when the size of the microwave gyromagnetic circulator is reduced.

Further, the presence of the tin-containing tank 123 on the pin 12 not only increases the contact area between the solder paste and the pin 12, but also forms a clamping structure, which greatly reduces the risk of the solder paste backing out along the axial direction of the pin 12 to ensure that the region of the foot 61 around the through-hole is closely adhered to the fixed portion 122, thereby improving the structural stability of the micro-subminiature microwave gyromagnetic circulator, and also ensuring the operational stability of the micro-subminiature microwave gyromagnetic circulator when the central conductor 6 is in conduction with the solder of the pin 12.

Further, the housing 1 comprises a base 12 and an upper cover 11, the base 12 is composed of a bottom plate 121 and three side plates 122 vertically connected to the upper part of the bottom plate 121, the upper part of the side plates 122 is provided with a protrusion 123, and the upper cover 11 is provided with a groove 111 in a one-to-one interference fit with the protrusion 123 of each side plate 122.

It can be seen from the above-mentioned description that the housing 1 adopts a cavity sealing method in which the base 12 and the upper cover 11 are riveted to avoid the problems of manual assembly of the upper cover 11 caused by miniaturization, and to avoid the adverse problems such as short circuit of the product caused by the metal wire generated when screwing the cover plate.

Further, the extension 121 is further provided with a vent slot 124 communicating with the tin-containing tank 123, the tin-containing tank 123 and the vent slot 124 are respectively provided around the pin 12, and the vent slot 124 is located on a side of the tin-containing tank 123 away from the fixed portion 122.

It can be seen from the above-mentioned description that when soldering tin paste, the vent slot 124 enables the tin liquid to smoothly force out the gas in the tin-containing tank 123, so that the tin liquid can better fill the tin-containing tank 123 to avoid air bubbles remaining in the tin-containing tank 123 after the tin paste is solidified, which is beneficial to improve the bonding force between the tin paste and the pin 12, thereby improving the structural stability of the micro-subminiature microwave gyromagnetic circulator.

Further, the cross-section of the tin-containing tank 123 is semicircular.

It can be seen from the above description that the semicircular tin-containing tank 123 enables the tin liquid to force out the gas in the tin-containing tank 123 more smoothly, thereby improving the structural stability of the micro-subminiature microwave gyromagnetic circulator.

Further, the opening of the cross section of the tin-containing tank 123 is oriented perpendicular to the central axis of the pin 12.

Further, an end surface of the fixed portion 122 near one end of the extension 121 is tangent to the tin-containing tank 123.

It can be seen from the above description that the processing of the tin-containing tank 123 is difficult.

Further, the wall surface of the vent slot 124 is tangent to the wall surface of the tin-containing tank 123.

It can be seen from the above description that the air in the tin-containing tank 123 can be smoothly discharged from the vent slot 124, thereby preventing the occurrence of air bubbles in the solidified solder paste and affecting the structural stability of the micro-subminiature microwave gyromagnetic circulator.

Further, an end surface of the fixed portion 122 near one end of the extension 121 is provided with a step 125, the feet 61 are at least partially received in the step 125, and a top surface of an area of the foot 61 in the step 125 is tangent to the tin-containing tank 123.

It can be seen from the above-mentioned description that the step 125 can play the role of positioning to facilitate the assembly of the pin 12 and the foot 61; at the same time, the tangent of the top surface of the step 125 to the tin-containing tank 123 enables the solder paste to smoothly cover a partial area of the top surface of the foot 61, thereby further improving the structural stability of the micro-subminiature microwave gyromagnetic circulator.

Further, the feet 61 are provided with a plurality of through-holes 611 connecting the top surface and the bottom surface of the foot 61, and a plurality of the through-holes 611 are uniformly distributed around the pin 12.

It can be seen from the above-mentioned description that the tin liquid can flow from the top surface of the foot 61 into the through-hole 611 and come into contact with the fixed portion 122 of the pin 12, which is beneficial for improving the stability of the welding of the pin 12, the tin paste and the central conductor 6.

Further, an end surface of the fixed portion 122 near one end of the extension 121 is provided with a receiving groove 126, and the penetrating hole 611 communicates with the receiving groove 126.

It can be seen from the above description that the receiving groove 126 can receive the tin liquid flowing out through the through-hole 611 and connect this part of the tin liquid with the bottom surface of the foot 61, that is, the tin paste covers not only a part area of the top surface of the foot 61 but also a part area of the bottom surface of the foot 61, thereby further improving the stability of the welding of the pin 12, the tin paste and the central conductor 6.

The central conductor 6 adopts a Y-shaped QBe2 structure with a diameter of 4 mm. Since $$R = \frac{x_0}{\omega_0\sqrt{\varepsilon\mu_e}} = \frac{1.841}{\omega_0\sqrt{\varepsilon\mu_0}},$$

under the condition of keeping the frequency unchanged, in order to obtain a product with a small size, we need to increase ε to reduce the size of the product, we increase the dielectric constant of the microwave gyromagnetic ferrite from 14.5 to 30 and above, so we obtain the conductor core size in two frequency bands of 3.5 GHZ and 2.6 GHZ.

When Eg. 1 ω0=2.6 GHZ, we usually use ε=14.5 ferrite, 2R=3.25 mm; with ferrite with ε=30, 2R=2.26 mm.

When Eg. 2 ω0=2.6 GHZ, we usually use ε=14.5 ferrite, 2R=3.25 mm; 2R=1.75 mm with ferrite ε=50

When Eg. 3 ω0=3.5 GHZ, we currently use ε=14.5 ferrite, 2R=3 mm; with ferrite with ε=30, 2R=2.08 mm.

When Eg. 4 ω0=3.5 GHZ, we currently use ε=14.5 ferrite, 2R=3 mm; with ferrite with ε=50, 2R=1.62 mm.

Based on this, the simulation design of the central conductor 6 is carried out, and the conductor structure of the 5 mm circulator is obtained, which achieves the goal of miniaturization.

Embodiment 1

With reference to FIGS. 1 to 10, the present invention relates to a micro-subminiature microwave gyromagnetic circulator, comprising a housing 1 and a compensation sheet 2, a first magnet 3, a first iron sheet 4, a first ceramic ring ferrite 5, a central conductor 6, a second ceramic ring ferrite 7, a second iron sheet 8, a second magnet 9 and a medium ferrule 10 provided successively from top to bottom and mounted inside the housing 1; the medium ferrule 10 comprises a connection seat 11 and three pins 12 provided on the connection seat 11, the connection seat 11 is made of an insulating material, the central conductor 6 is Y-shaped, and three feet 61 of the central conductor 6 are respectively provided with through-holes cooperating with the pins 12; the first ceramic ring ferrite 5 comprises a first ceramic ring 51 and a first ferrite 52 sleeved in the first ceramic ring 51, the second ceramic ring ferrite 7 comprises a second ceramic ring 71 and a second ferrite 72 sleeved in the second ceramic ring 71, and the dielectric constant of the first ceramic ring ferrite 5 and the dielectric constant of the second ceramic ring ferrite 7 are respectively greater than or equal to 30; the first ferrite 52 and the second ferrite 72 are respectively BiCaVIG ferrites (the BiCaVIG ferrite is a bismuth calcium vanadium garnet ferrite without yttrium).

Specifically, the housing 1 comprises a base 12 and an upper cover 11, the base 12 is composed of a bottom plate 121 and three side plates 122 vertically connected to the upper part of the bottom plate 121, the upper part of the side plates 122 is provided with a protrusion 123, and the upper cover 11 is provided with a groove 111 in a one-to-one interference fit with the protrusion 123 of each side plate 122.

Figure 2:
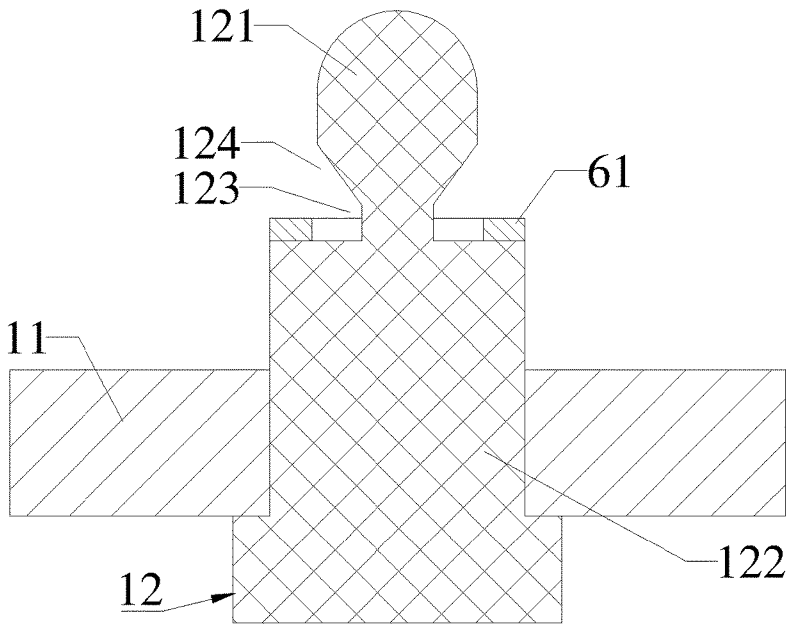
FIG. 2 is a cross-sectional view of a medium ferrule in a micro-subminiature microwave gyromagnetic circulator according to an embodiment of the present invention.

As shown in FIG. 2, the pin 12 comprises an extension 121 and a fixed portion 122 which are connected, wherein the diameter of the extension 121 is smaller than the diameter of the fixed portion 122, the fixed portion 122 is fixed on the connection seat 11, the pin 12 and the feet 61 are welded at the through-holes via solder paste, the connection of the extension 121 and the fixed portion 122 is provided with a tin-containing tank 123 for containing part of the solder paste, and the bottom surface of the feet 61 abuts against the end surface of the fixed portion 122 near one end of the extension 121.

In order to further increase the contact area between the solder paste and the pin 12 and avoid the occurrence of air bubbles inside the solder paste, the protruding portion 121 is further provided with a vent slot 124 communicating with the tin-containing tank 123, the tin-containing tank 123 and the vent slot 124 are respectively provided around the pin 12, and the vent slot 124 is located on a side of the tin-containing tank 123 away from the fixed portion 122. Preferably, the wall surface of the vent slot 124 is tangent to the wall surface of the tin-containing tank 123.

Alternatively, the housing 1 has a diameter of 5 mm and the central conductor 6 has a diameter of 4 mm.

Test

Figure 3:
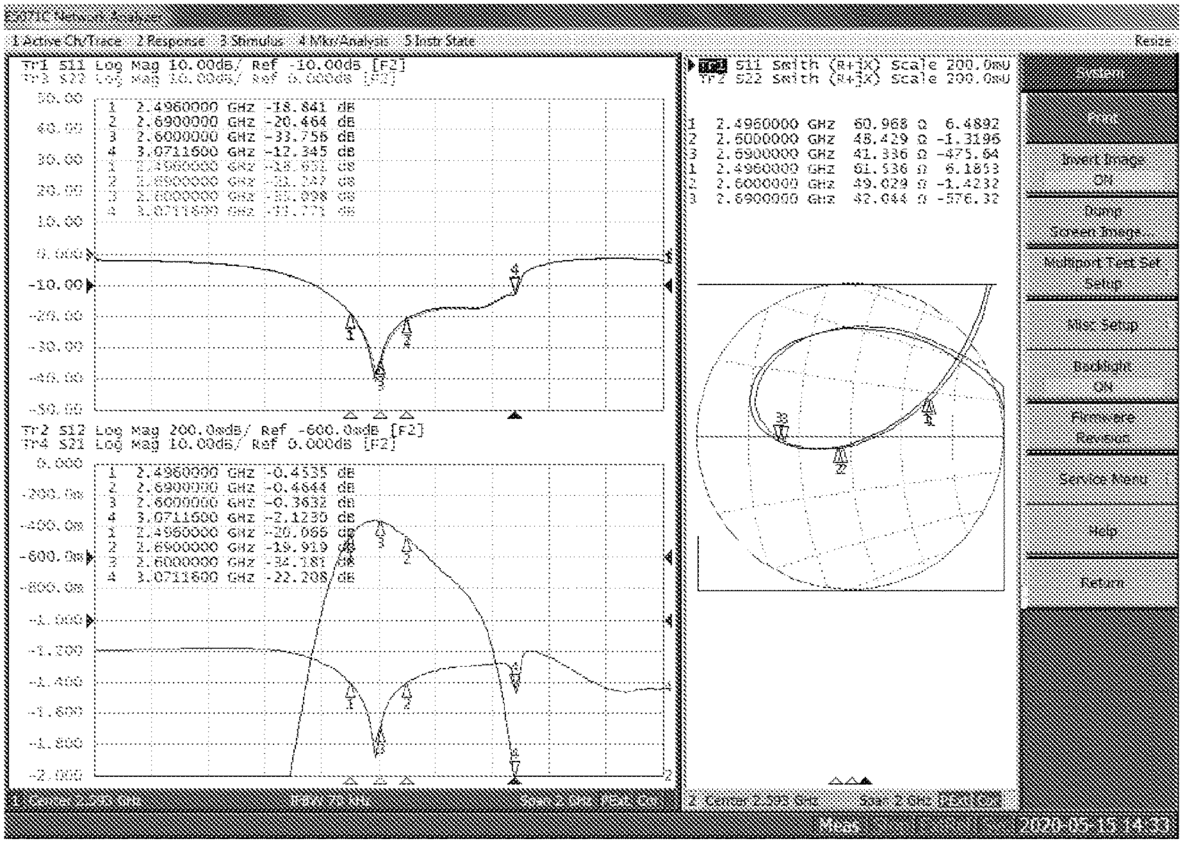
FIG. 3 is a parameter and waveform diagram of a micro-subminiature microwave gyromagnetic circulator in the frequency band of 2496-2690 MHZ according to the first embodiment of the present invention.

Under the condition that the dielectric constants of the first ceramic ring ferrite 5 and the second ceramic ring ferrite 7 are both 30, performing simulation on the conductor at the 2.6 G frequency band and matching other structures and materials, and the obtained results are as shown in FIG. 3; S11 and S22 have a return loss, and the isolation is ≥18 dB; S12 insertion loss ≤0.5 dB; impedance mark1 real part 6.9±3Ω, imaginary part 3 to 9Ω; impedance mark2 real part 48±3Ω, imaginary part −3 to 3Ω; impedance mark3 real part 41±3Ω, imaginary part −3 to 3Ω.

Figure 4:
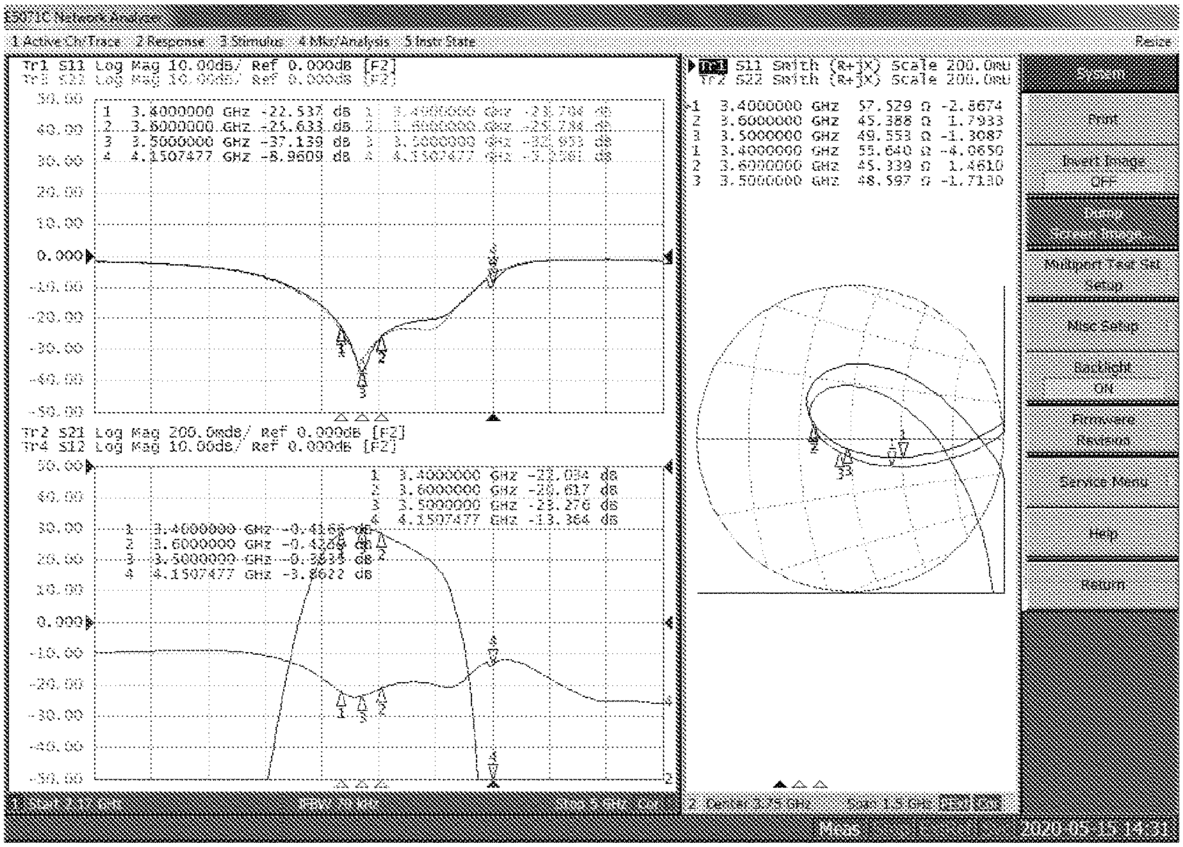
FIG. 4 is a parameter and waveform diagram of a micro-subminiature microwave gyromagnetic circulator in the frequency band of 3400-3600 MHZ according to the first embodiment of the present invention.

Under the condition that the dielectric constants of the first ceramic ring ferrite 5 and the second ceramic ring ferrite 7 are both 30, performing simulation on the conductor at the 3.5 G frequency band and matching other structures and materials; the results are as shown in FIG. 4; S11 and S22 have a return loss, and the isolation is ≥21 dB; S12 insertion loss ≤0.5 dB; impedance mark1 real part 55±3Ω, imaginary part −7 to 0Ω; impedance mark2 real part 45±3Ω, imaginary part −1 to 4Ω; impedance mark3 real part 48±3Ω, imaginary part −4 to 1Ω.

Embodiment II

Figure 5:
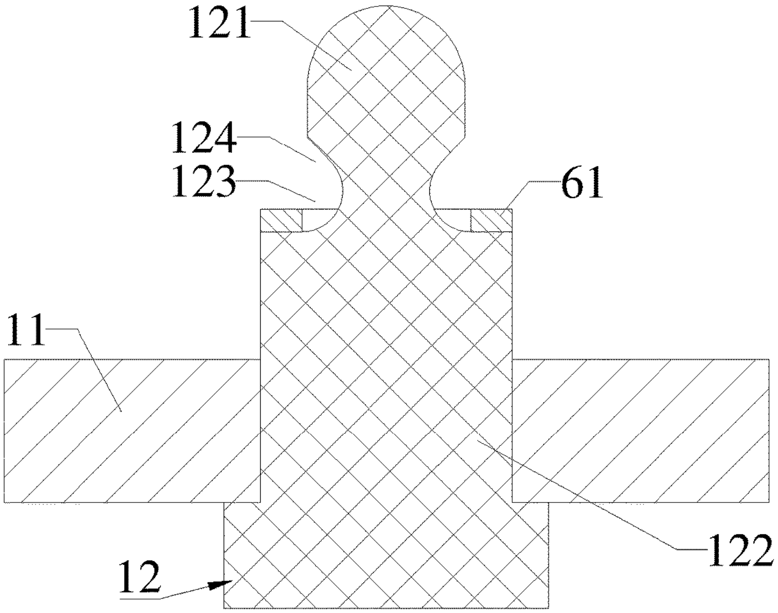
FIG. 5 is a cross-sectional view of a medium ferrule in a micro-subminiature microwave gyromagnetic circulator according to a second embodiment of the present invention.

With reference to FIGS. 1 and 5, the present invention relates to a micro-subminiature microwave gyromagnetic circulator, comprising a housing 1 and a compensation sheet 2, a first magnet 3, a first iron sheet 4, a first ceramic ring ferrite 5, a central conductor 6, a second ceramic ring ferrite 7, a second iron sheet 8, a second magnet 9 and a medium ferrule 10 provided successively from top to bottom and mounted inside the housing 1; the medium ferrule 10 comprises a connection seat 11 and three pins 12 provided on the connection seat 11, the connection seat 11 is made of an insulating material, the central conductor 6 is Y-shaped, and three feet 61 of the central conductor 6 are respectively provided with through-holes cooperating with the pins 12; the first ceramic ring ferrite 5 comprises a first ceramic ring 51 and a first ferrite 52 sleeved in the first ceramic ring 51, the second ceramic ring ferrite 7 comprises a second ceramic ring 71 and a second ferrite 72 sleeved in the second ceramic ring 71, and the dielectric constant of the first ceramic ring ferrite 5 and the dielectric constant of the second ceramic ring ferrite 7 are respectively greater than or equal to 30; the first ferrite 52 and the second ferrite 72 are respectively BiCaVIG ferrites (the BiCaVIG ferrite is a bismuth calcium vanadium garnet ferrite without yttrium).

Specifically, the housing 1 comprises a base 12 and an upper cover 11, the base 12 is composed of a bottom plate 121 and three side plates 122 vertically connected to the upper part of the bottom plate 121, the upper part of the side plates 122 is provided with a protrusion 123, and the upper cover 11 is provided with a groove 111 in a one-to-one interference fit with the protrusion 123 of each side plate 122.

As shown in FIG. 5, the pin 12 comprises an extension 121 and a fixed portion 122 which are connected, wherein the diameter of the extension 121 is smaller than the diameter of the fixed portion 122, the fixed portion 122 is fixed on the connection seat 11, the pin 12 and the feet 61 are welded at the through-holes via solder paste, the connection of the extension 121 and the fixed portion 122 is provided with a tin-containing tank 123 for containing part of the solder paste, and the bottom surface of the feet 61 abuts against the end surface of the fixed portion 122 near one end of the extension 121.

In order to further increase the contact area between the solder paste and the pin 12 and avoid the occurrence of air bubbles inside the solder paste, the protruding portion 121 is further provided with a vent slot 124 communicating with the tin-containing tank 123, the tin-containing tank 123 and the vent slot 124 are respectively provided around the pin 12, and the vent slot 124 is located on a side of the tin-containing tank 123 away from the fixed portion 122.

In order to enable the gas in the tin-containing tank 123 to be discharged more smoothly, it is preferable that the cross section of the tin-containing tank 123 is semi-circular; the opening of the cross section of the tin-containing tank 123 faces perpendicular to the central axis of the pin 12; an end face of the fixed portion 122 near one end of the extension 121 is tangent to the tin-containing tank 123; the wall surface of the vent slot 124 is tangent to the wall surface of the tin-containing tank 123.

Embodiment III

Figure 6:
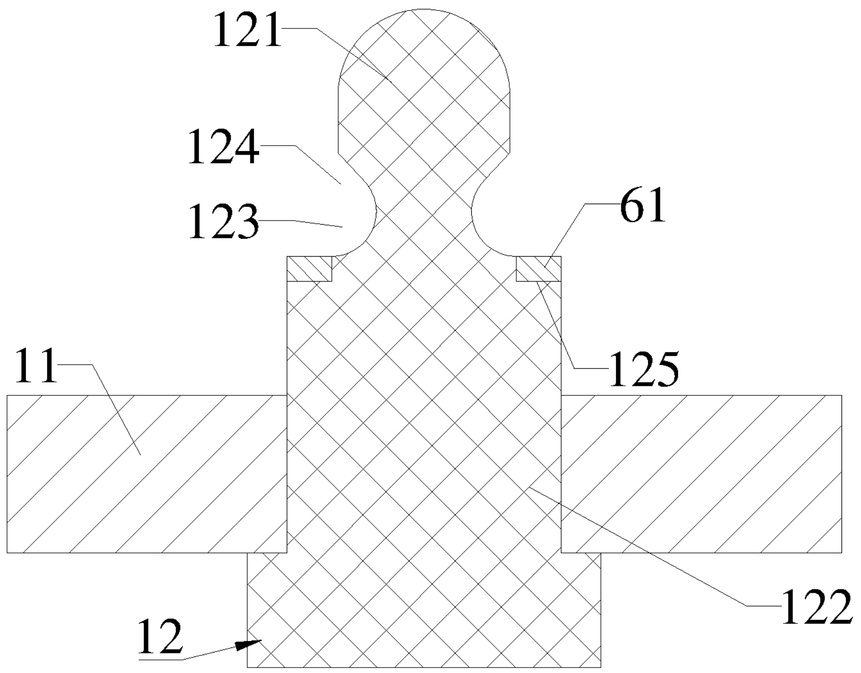
FIG. 6 is a cross-sectional view of a medium ferrule in a micro-subminiature microwave gyromagnetic circulator according to a third embodiment of the present invention.
Figure 7:
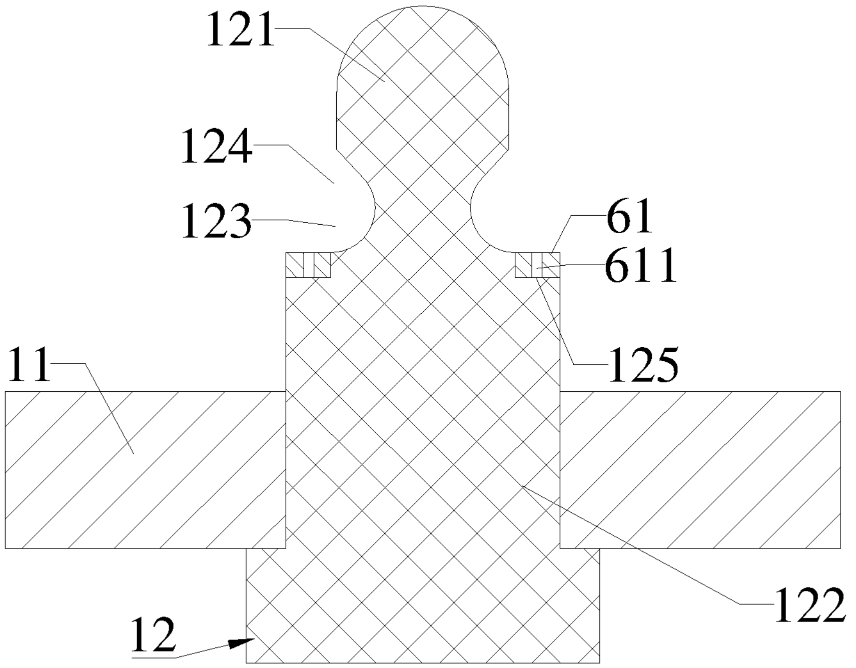
FIG. 7 is a cross-sectional view of a medium ferrule in another micro-subminiature microwave gyromagnetic circulator according to a third embodiment of the present invention.

With reference to FIGS. 1, 6 and 7, the present invention relates to a micro-subminiature microwave gyromagnetic circulator, comprising a housing 1 and a compensation sheet 2, a first magnet 3, a first iron sheet 4, a first ceramic ring ferrite 5, a central conductor 6, a second ceramic ring ferrite 7, a second iron sheet 8, a second magnet 9 and a medium ferrule 10 provided successively from top to bottom and mounted inside the housing 1; the medium ferrule 10 comprises a connection seat 11 and three pins 12 provided on the connection seat 11, the connection seat 11 is made of an insulating material, the central conductor 6 is Y-shaped, and three feet 61 of the central conductor 6 are respectively provided with through-holes cooperating with the pins 12; the first ceramic ring ferrite 5 comprises a first ceramic ring 51 and a first ferrite 52 sleeved in the first ceramic ring 51, the second ceramic ring ferrite 7 comprises a second ceramic ring 71 and a second ferrite 72 sleeved in the second ceramic ring 71, and the dielectric constant of the first ceramic ring ferrite 5 and the dielectric constant of the second ceramic ring ferrite 7 are respectively greater than or equal to 30; the first ferrite 52 and the second ferrite 72 are respectively BiCaVIG ferrites (the BiCaVIG ferrite is a bismuth calcium vanadium garnet ferrite without yttrium).

Specifically, the housing 1 comprises a base 12 and an upper cover 11, the base 12 is composed of a bottom plate 121 and three side plates 122 vertically connected to the upper part of the bottom plate 121, the upper part of the side plates 122 is provided with a protrusion 123, and the upper cover 11 is provided with a groove 111 in a one-to-one interference fit with the protrusion 123 of each side plate 122.

As shown in FIG. 6, the pin 12 comprises an extension 121 and a fixed portion 122 which are connected, wherein the diameter of the extension 121 is smaller than the diameter of the fixed portion 122, the fixed portion 122 is fixed on the connection seat 11, the pin 12 and the feet 61 are welded at the through-holes via solder paste, the connection of the extension 121 and the fixed portion 122 is provided with a tin-containing tank 123 for containing part of the solder paste, and the bottom surface of the feet 61 abuts against the end surface of the fixed portion 122 near one end of the extension 121.

In order to further increase the contact area between the solder paste and the pin 12 and avoid the occurrence of air bubbles inside the solder paste, the protruding portion 121 is further provided with a vent slot 124 communicating with the tin-containing tank 123, the tin-containing tank 123 and the vent slot 124 are respectively provided around the pin 12, and the vent slot 124 is located on a side of the tin-containing tank 123 away from the fixed portion 122.

In order to allow the gas in the tin-containing tank 123 to be discharged more smoothly, it is preferable that the cross section of the tin-containing tank 123 is semi-circular; the opening of the cross section of the tin-containing tank 123 faces perpendicular to the central axis of the pin 12; the wall surface of the vent slot 124 is tangent to the wall surface of the tin-containing tank 123.

Further, an end surface of the fixed portion 122 near one end of the extension 121 is provided with a step 125, and the feet 61 are at least partially received in the step 125, and the step 125 is provided to facilitate positioning and assembling of the foot 61. Preferably, the top surface of the area of the foot 61 located in the step 125 is tangent to the tin-containing tank 123, so that the tin liquid can smoothly flow onto the top surface of the foot 61, thereby further improving the stability of the connection of the solder paste, the pin 12 and the central conductor 6.

As shown in FIG. 7, the feet 61 are provided with a plurality of through-holes 611 connecting the top surface and the bottom surface of the foot 61, and a plurality of the through-holes 611 are uniformly distributed around the pin 12. The perforation 611 corresponds to the bottom surface of the step 125, and the tin liquid can flow into the perforation 611 via the top surface of the foot 61, thereby increasing the contact area between the tin paste and the central conductor 6, and further improving the bonding force between the tin paste and the central conductor 6; at the same time, when the tin liquid can completely fill the through-hole 611, the solder paste part located in the through-hole 611 can also form a bonding surface with the bottom surface of the step 125 to improve the bonding force between the solder paste and the pin 12, that is to say, the arrangement of the through-hole 611 can improve the bonding force between at least two of the solder paste, the central conductor 6 and the pin 12 to improve the structural stability of the micro-subminiature microwave gyromagnetic circulator.

Embodiment IV

With reference to FIGS. 1, 8, 9 and 10, the present invention relates to a micro-subminiature microwave gyromagnetic circulator, comprising a housing 1 and a compensation sheet 2, a first magnet 3, a first iron sheet 4, a first ceramic ring ferrite 5, a central conductor 6, a second ceramic ring ferrite 7, a second iron sheet 8, a second magnet 9 and a medium ferrule 10 provided successively from top to bottom and mounted inside the housing 1; the medium ferrule 10 comprises a connection seat 11 and three pins 12 provided on the connection seat 11, the connection seat 11 is made of an insulating material, the central conductor 6 is Y-shaped, and three feet 61 of the central conductor 6 are respectively provided with through-holes cooperating with the pins 12; the first ceramic ring ferrite 5 comprises a first ceramic ring 51 and a first ferrite 52 sleeved in the first ceramic ring 51, the second ceramic ring ferrite 7 comprises a second ceramic ring 71 and a second ferrite 72 sleeved in the second ceramic ring 71, and the dielectric constant of the first ceramic ring ferrite 5 and the dielectric constant of the second ceramic ring ferrite 7 are respectively greater than or equal to 30; the first ferrite 52 and the second ferrite 72 are respectively BiCaVIG ferrites (the BiCaVIG ferrite is a bismuth calcium vanadium garnet ferrite without yttrium).

Specifically, the housing 1 comprises a base 12 and an upper cover 11, the base 12 is composed of a bottom plate 121 and three side plates 122 vertically connected to the upper part of the bottom plate 121, the upper part of the side plates 122 is provided with a protrusion 123, and the upper cover 11 is provided with a groove 111 in a one-to-one interference fit with the protrusion 123 of each side plate 122.

Figure 8:
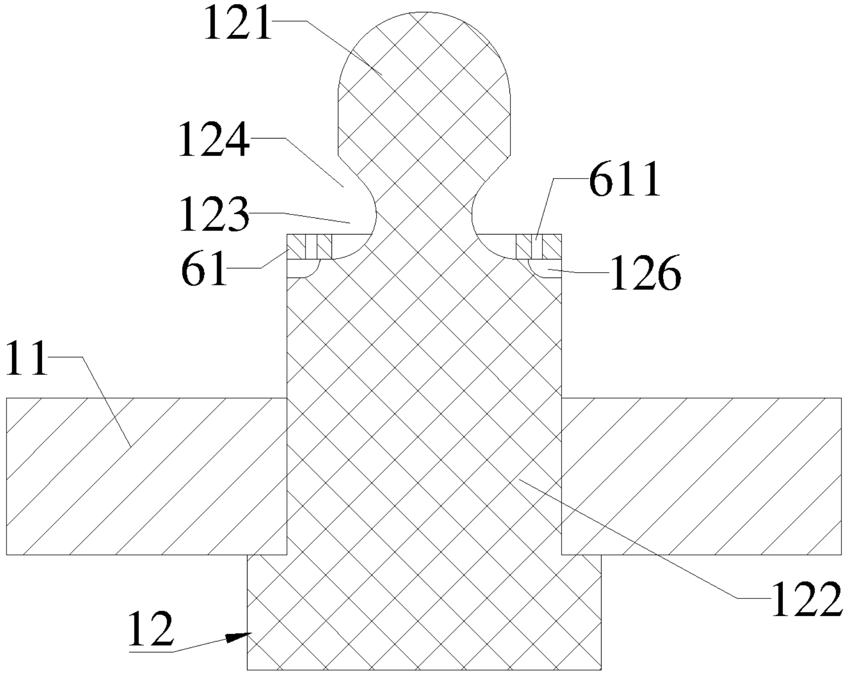
FIG. 8 is a cross-sectional view of a medium ferrule in a micro-subminiature microwave gyromagnetic circulator according to a fourth embodiment of the present invention.

As shown in FIG. 8, the pin 12 comprises an extension 121 and a fixed portion 122 which are connected, wherein the diameter of the extension 121 is smaller than the diameter of the fixed portion 122, the fixed portion 122 is fixed on the connection seat 11, the pin 12 and the feet 61 are welded at the through-holes via solder paste, the connection of the extension 121 and the fixed portion 122 is provided with a tin-containing tank 123 for containing part of the solder paste, and the bottom surface of the feet 61 abuts against the end surface of the fixed portion 122 near one end of the extension 121.

In order to further increase the contact area between the solder paste and the pin 12 and avoid the occurrence of air bubbles inside the solder paste, the protruding portion 121 is further provided with a vent slot 124 communicating with the tin-containing tank 123, the tin-containing tank 123 and the vent slot 124 are respectively provided around the pin 12, and the vent slot 124 is located on a side of the tin-containing tank 123 away from the fixed portion 122.

In order to allow the gas in the tin-containing tank 123 to be discharged more smoothly, it is preferable that the cross section of the tin-containing tank 123 is semi-circular; the opening of the cross section of the tin-containing tank 123 faces perpendicular to the central axis of the pin 12; the wall surface of the vent slot 124 is tangent to the wall surface of the tin-containing tank 123.

As shown in FIG. 8, the feet 61 are provided with a plurality of through-holes 611 connecting the top surface and the bottom surface of the foot 61, and a plurality of the through-holes 611 are uniformly distributed around the pin 12. An end surface of the fixed portion 122 near one end of the extension 121 is provided with a receiving groove 126, and the penetrating hole 611 communicates with the receiving groove 126.

Preferably, the wall surface of the receiving groove 126 near the central axis of the pin 12 is curved so that the tin liquid can smoothly flow into the receiving groove 126 through the through-hole 611. In order to allow the tin liquid to flow more smoothly in the receiving groove 126, it is preferable that the receiving groove 126 communicates with an outer wall of the fixed portion 122.

Figure 9:
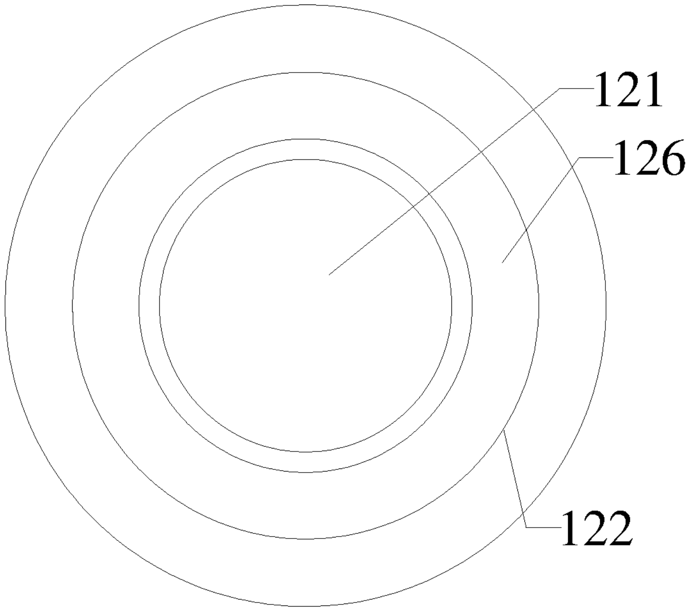
FIG. 9 is a top view of a pin in a micro-subminiature microwave gyromagnetic circulator according to a fourth embodiment of the present invention.
Figure 10:
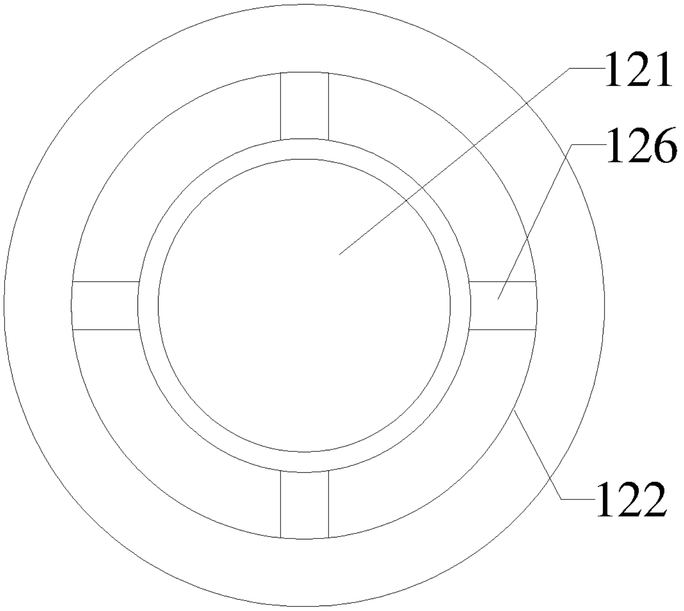
FIG. 10 is a top view of a pin in another micro-subminiature microwave gyromagnetic circulator according to a fourth embodiment of the present invention.

Specifically, as shown in FIG. 9, the receiving groove 126 may be annular. Alternatively, as shown in FIG. 10, the number of the receiving grooves 126 is multiple, and the plurality of receiving grooves 126 are provided in one-to-one correspondence with the through-holes 611. In this case, the portion of the solder paste located below the feet 61 is in the shape of a radial line, which greatly improves the coupling force of the solder paste, the pin 12 and the central conductor 6, and ensures that the hanging end of the pin 12 is neither axially separated from the solder paste nor circumferentially rotated relative to the central conductor 6.

In summary, the micro-subminiature microwave gyromagnetic circulator structure provided in the present invention reduces the volume size of the microwave gyromagnetic circulator without reducing the bandwidth, which is consistent with the development trend of miniaturization of microwave gyromagnetic circulator; the structure stability and conduction stability of the microwave gyromagnetic circulator are effectively improved by welding the central conductor to the pin and providing a tin-containing tank on the pin.

While the foregoing is directed to embodiments of the present invention, other and further embodiments of the invention may be devised without departing from the basic scope thereof, and the scope thereof is determined by the claims that follow.

The invention claimed is:

1. A micro-subminiature microwave gyromagnetic circulator, comprising a housing and a compensation sheet, a first magnet, a first iron sheet, a first ceramic ring ferrite, a central conductor, a second ceramic ring ferrite, a second iron sheet, a second magnet and a medium ferrule provided successively from top to bottom and mounted inside the housing; the medium ferrule comprises a connection seat and three pins provided on the connection seat, the central conductor is Y-shaped, and three feet of the central conductor are respectively provided with through-holes matching the pins; the first ceramic ring ferrite comprises a first ceramic ring and a first ferrite sleeved in the first ceramic ring, the second ceramic ring ferrite comprises a second ceramic ring and a second ferrite sleeved in the second ceramic ring, and the dielectric constant of the first ceramic ring ferrite and the dielectric constant of the second ceramic ring ferrite are respectively greater than or equal to 30; the first ferrite and the second ferrite are respectively BiCaVIG ferrites; the pin comprises an extension and a fixed portion which are connected, the diameter of the extension is smaller than the diameter of the fixed portion fixed on the connection seat, the pins and the feet are welded at the through-holes via solder paste, the connection of the extension and the fixed portion is provided with a tin-containing tank for receiving part of the solder paste, and a bottom surface of the foot abuts against an end surface of the fixed portion near one end of the extension.

2. The micro-subminiature microwave gyromagnetic circulator according to claim 1, wherein the housing comprises a base and an upper cover, the base is composed of a bottom plate and three side plates vertically connected to the upper part of the bottom plate, the upper part of the side plates is provided with a protrusion, and the upper cover is provided with a groove in a one-to-one interference fit with the protrusion of each side plate.

3. The micro-subminiature microwave gyromagnetic circulator according to claim 1, wherein the extension is further provided with a vent slot communicating with the tin-containing tank, the tin-containing tank and the vent slot are respectively provided around the pin, and the vent slot is located on a side of the tin-containing tank away from the fixed portion.

4. The micro-subminiature microwave gyromagnetic circulator according to claim 3, wherein the tin-containing tank has a semi-circular cross section.

5. The micro-subminiature microwave gyromagnetic circulator according to claim 4, wherein an opening of the cross section of the tin-containing tank is oriented perpendicular to the central axis of the pin.

6. The micro-subminiature microwave gyromagnetic circulator according to claim 5, wherein an end surface of the fixed portion near one end of the extension is tangent to the tin-containing tank.

7. The micro-subminiature microwave gyromagnetic circulator according to claim 4, wherein the wall surface of the vent slot is tangent to the wall surface of the tin-containing tank.

8. The micro-subminiature microwave gyromagnetic circulator according to claim 4, wherein an end surface of the fixed portion near one end of the extension is provided with a step, the foot is at least partially received in the step, and a top surface of an area of the foot in the step is tangent to the tin-containing tank.

9. The micro-subminiature microwave gyromagnetic circulator according to claim 1, wherein the foot is provided with a plurality of through-holes connecting the top surface and the bottom surface of the foot, and a plurality of the through-holes are uniformly distributed around the pin.

10. The micro-subminiature microwave gyromagnetic circulator according to claim 9, wherein a receiving groove is provided on one end of the extension and is provided with a receiving groove, and the through-hole communicates with the receiving groove.

* * * * *